United States Patent [19]
Jordan

[11] Patent Number: 4,998,505
[45] Date of Patent: Mar. 12, 1991

[54] SALMONID EGG INCUBATOR

[76] Inventor: Fred P. Jordan, 3035 Newton Street, Nanaimo, British Columbia, Canada, V9T 2Y2

[21] Appl. No.: 402,015

[22] Filed: Sep. 1, 1989

[30] Foreign Application Priority Data

Sep. 29, 1988 [CA] Canada ................................. 578868

[51] Int. Cl.⁵ ........................................... A01K 61/00
[52] U.S. Cl. ................................................... 119/3
[58] Field of Search ................................... 119/2, 3, 4

[56] References Cited

U.S. PATENT DOCUMENTS

| | | | |
|---|---|---|---|
| 3,858,554 | 1/1975 | Beaupoil et al. | 119/2 |
| 3,886,905 | 6/1975 | McNeil | 119/3 |
| 3,929,100 | 12/1975 | Thomas et al. | 119/2 |
| 4,014,293 | 3/1977 | Salter | 119/3 |
| 4,214,551 | 7/1980 | McNeil et al. | 119/3 |
| 4,317,429 | 3/1982 | Leighton et al. | 119/2 |

Primary Examiner—Gene Mancene
Assistant Examiner—R. Thomas Price
Attorney, Agent, or Firm—Townsend and Townsend

[57] ABSTRACT

A salmonid egg incubator has a plurality of cells each for containing a single salmonid egg. Each cell has walls for retaining the egg and an alevin hatched therefrom alevin outlet opening one of the walls is dimensioned to prevent the alevin from escaping through the opening until the alevin has absorbed at least a major portion of its yolk sack.

22 Claims, 2 Drawing Sheets 4,998,505

SALMONID EGG INCUBATOR

FIELD OF THE INVENTION

The present invention relates to salmonid egg incubators and to methods for the incubation of salmonid eggs.

BACKGROUND OF THE INVENTION

In the natural state, salmonid eggs are deposited in gravel and suffer substantial mortalities from the time of egg deposition to the fry emergence stage, which occurs some months later.

Under normal conditions, about 80 percent of all eggs carried by a female perish. There are a number of reasons for this. Firstly, not all of the eggs are fertilized when they are deposited and not all of them are successfully buried. Also, fungus from dead eggs tends to spread to healthy eggs. In addition, some of the eggs are eaten by predators at the time of deposition, and some are covered with silt and suffocated, whereas others dry out as a result of a drop in water level.

Consequently, attempts have been made in the past to provide an incubator which will improve the survival rate of the salmonid eggs.

BRIEF SUMMARY OF THE INVENTION

It is accordingly an object of the present invention to provide a novel and advantageous salmonid egg incubator the use of which substantially improves the rate of survival of salmonid alevin during incubation.

It is a further object of the present invention to provide an immersible salmonid egg incubator having cells for containing individual salmonid eggs and openings to enable alevin, when developed from the eggs, to escape from the cells.

It is a still further object of the invention to provide an immersible incubator with cells for containing salmonid eggs, the cells being open so as to allow water flow past the eggs.

According to the present invention, there is provided a salmonid egg incubator comprising means defining a plurality of cells each for containing a single salmonid egg, the cells each having walls for retaining therein the egg and an alevin hatched therefrom and means defining an alevin outlet opening in one of the walls. The outlet openings are dimensioned so as to prevent the alevin from escaping through the opening until the alevin has absorbed at least a major portion of its yolk sack, but tho allow the alevin without their yolk sacks to escape.

Using the present salmonid egg incubator, the eggs and the alevin which hatch from the eggs are protected in their individual cells until the alevin have matured sufficiently to absorb at least the major portion of their yolk sacks and, thus, to leave their cells. Consequently, most of the causes for the high mortality of salmonid eggs and alevins in the natural state are eliminated, so that the survival rate of the fry is increased from about twenty percent in the natural state to about eighty to ninety percent in the present incubator.

The present invention also provides a method of incubating salmonid eggs which comprises the steps of placing the eggs into respective ones of an array of salmonid egg incubation cells, immersing the array of cells in water and allowing the water to enter the cells through respective openings, the openings being dimensioned to retain the eggs and the alevin hatched therefrom within the cells until each of the alevin has absorbed at least a major portion of its yolk sack and then to allow the alevin to escape from their respective cells through the respective openings.

In addition, the water is allowed to flow through each of the cells during the incubation of the eggs, so that the eggs are constantly washed by the flow of water and, thus, are supplied with oxygen by the water.

BRIEF DESCRIPTION OF THE DRAWINGS

Further objects, features and advantages of the invention will be more readily understood from the following description of the invention which is given, by way of example, with reference to the accompanying drawings, in which.

THE PREFERRED EMBODIMENT

Figure 1:
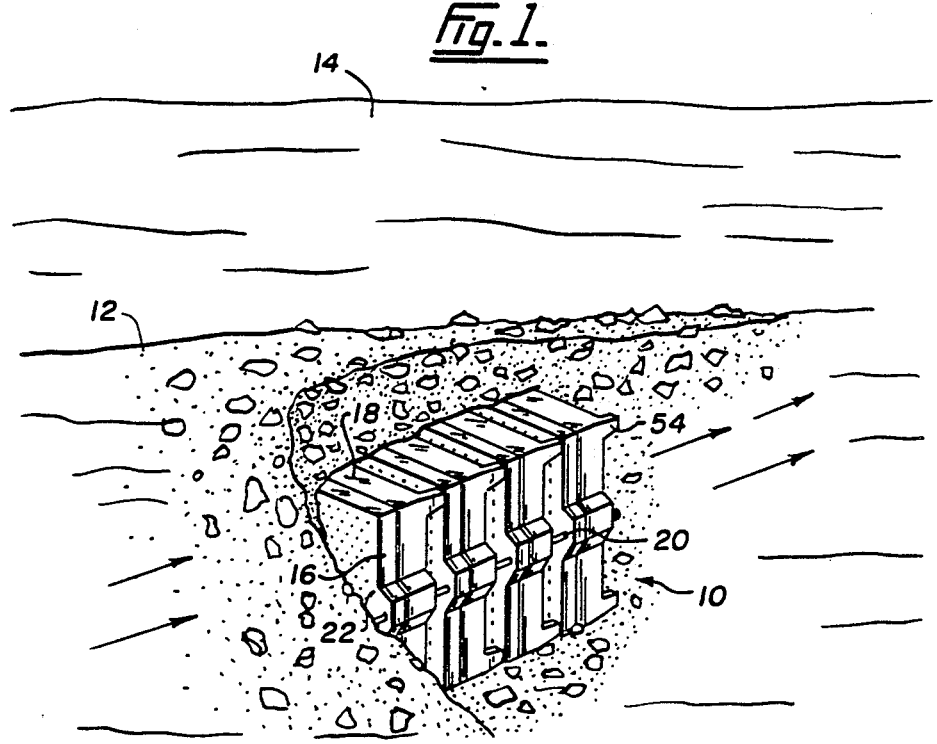
FIG. 1 shows a view in perspective of a salmonid egg incubator embodying the present invention and buried in a bed of gravel at the bottom of a body of water.

The incubator shown in FIG. 1 is indicated generally by reference numeral 10 and is illustrated, in FIG. 1, buried in a bed of gravel 12 which is located at the bottom of a body of water 14.

The incubator 10 is, in this case, formed of four modules, each comprising a first component or section 16 and a second component or section 18, the components 16 and 18 being injection-molded from non-toxic plastic material.

These four modules are connected together by means of a pair of connecting rods, one of which is shown in FIG. 1 and indicated by reference numeral 20, and which are inserted, as described in greater detail below, through openings in opposite sides of the incubator modules. The connecting rods 20 may be made of nylon, aluminum or stainless steel, or any other suitable corrosion-resistant material and secured by nuts (not shown) in threaded engagement with the rods.

Figure 2:
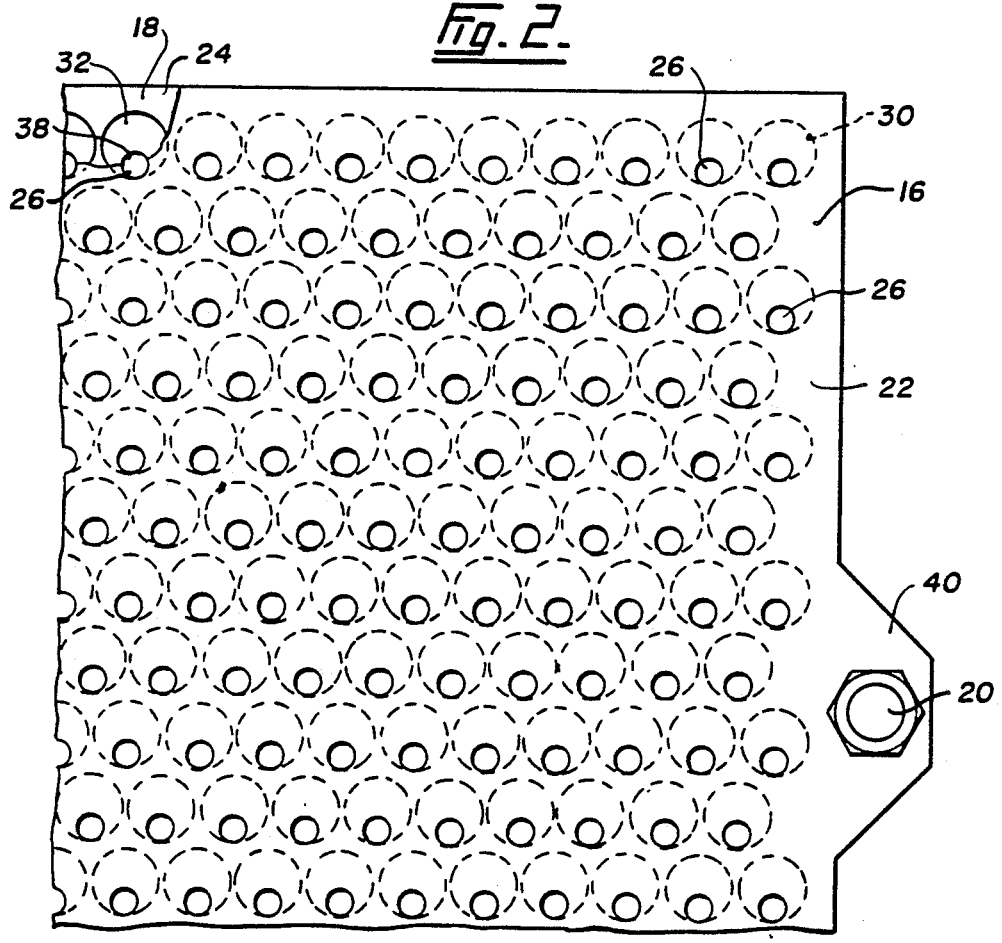
FIG. 2 shows a broken-away view in elevation of part of one of the sections of the incubator of FIG. 1.
Figure 3:
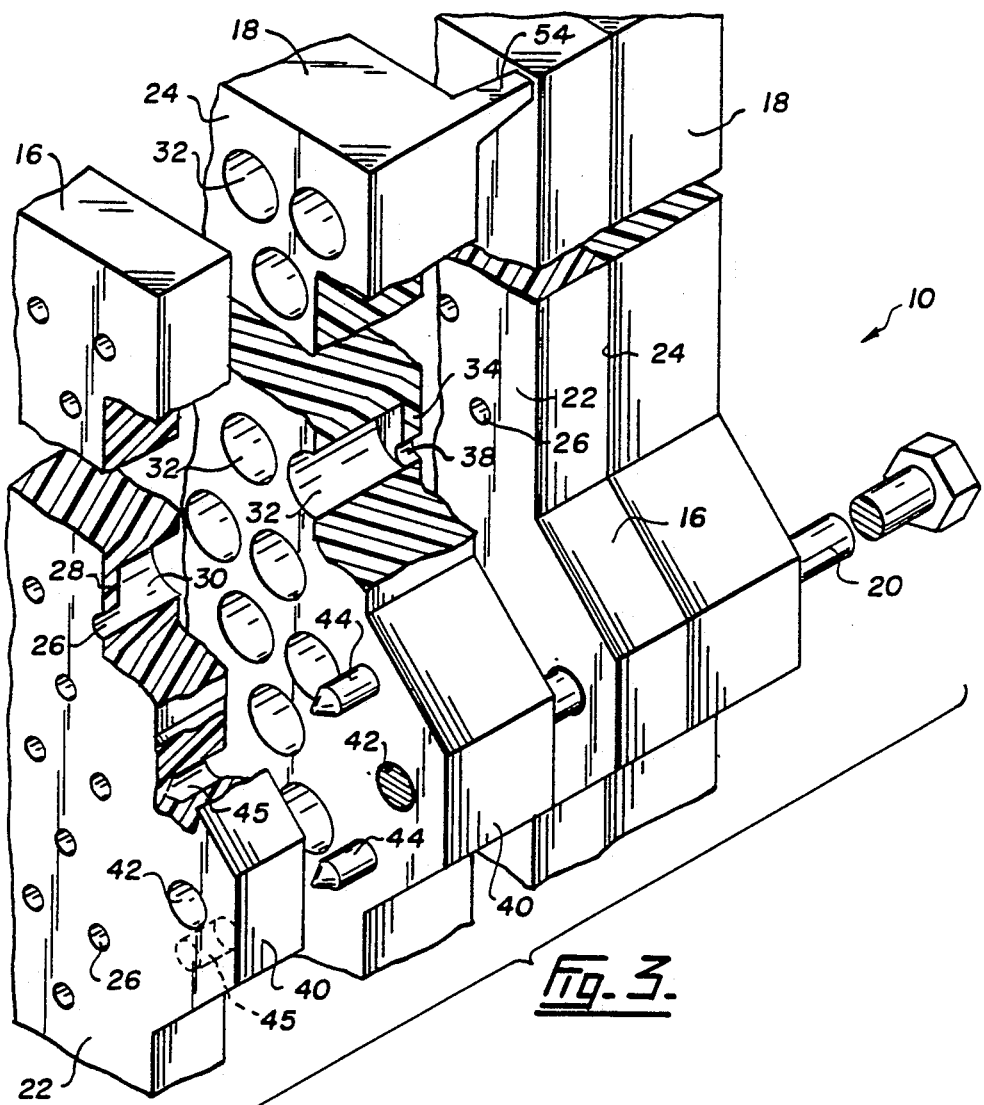
FIG. 3 shows a broken-away view, taken in perspective, of parts of two modules of the incubator of FIG. 1.

FIG. 2 shows a portion of a front face or surface, indicated by reference numeral 22, of one of the incubator module sections 16, with the section 16 broken-away to reveal a small portion of a front face 24 of the adjacent incubator module section 18.

The front face or surface 22 of the section 16 is interrupted by a plurality of alevin outlet openings 26, each of which extends through a front wall 28 of the section 16 and communicates with a cylindrical recess 30 (FIG. 4), which extends from the front wall 28 to the back of the incubator module section 16. Each recess 30 in the incubator module section 16 is axially aligned with a respective cylindrical recess 32, which is formed in the front face 24 of the incubator module section 18 and which extends from the front face 24 to a rear wall 34 of the incubator module section 18.

Figure 4:
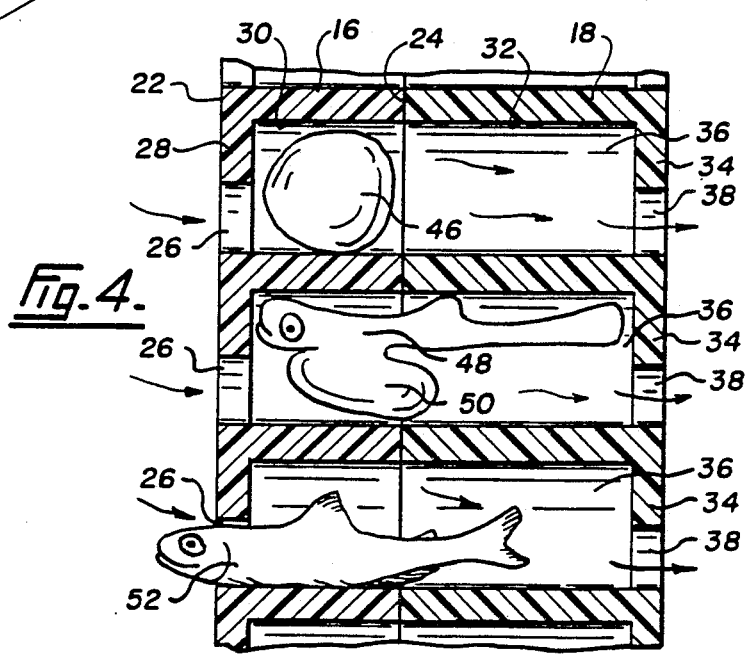
FIG. 4 shows a view taken in cross-section through three cells of the incubator of FIG. 1.

As is apparent from FIG. 4, the opening 26 has a diameter which is substantially less than the diameter of the recesses 30 and 32. Also, the recesses 30 and 32 cooperate to form a cylindrical cell 36 extending from the front wall 28 to the back wall 34 when the incubator module sections 16 and 18 are arranged back-to-front, as shown.

In addition to the opening 26 formed at one end of the cell 36, another outlet opening 38, which has the same diameter as the opening 26, is formed in the rear wall 34 at the bottom of the opposite end of the cell 36, so that water can flow through the opening 26 into the cell 36, along the cell 36 and from the cell 36 through the opening 38 as indicated by the arrow in FIG. 4 to wash the eggs and to supply them with oxygen.

The incubator module sections 16 and 18 are also each formed, at opposite sides thereof, with trapezoidally-shaped lateral projections 40, and a securing rod 20 extends through cylindrical openings 42 in the projecttions 40 for securing together the modules of the incubator.

The front face 24 of each of the incubator module sections 18 is also provided, at its lateral projection 40, with a pair of vertically spaced, horizontally forwardly projecting cylindrical alignment pins 44 which fit into corresponding cylindrical recesses 45 formed in the rear of the respective incubator module front section 16. By these means, the two sections 16 and 18 of each individual module are releasably secured in accurate alignment with one another, even before the insertion of the securing rod 20 into the cylindrical openings 42.

The recesses 30 are dimensioned so as to receive, in each one of the recesses 30, a single salmonid egg, one of which is indicated by reference numeral 46 in FIG. 4. Thus, inadvertent insertion of two eggs into one of the recesses 30 is avoided.

The cells 36 are dimensioned so as to allow an alevin 48, hatched from the egg 46, to be accommodated during the growth of the alevin until it absorbs at least a major portion of its yolk sack, which is indicated by reference numeral 50.

The openings 26, however, are made sufficiently small to ensure that the alevin 48 cannot escape from the cell 36 through the opening 26 or 38 until at least a major portion, and preferably substantially all, of the yolk sack 50 has been absorbed by the alevin 48. When this has occurred, then the alevin 48, now usually a fry 52, can fit through the opening 26 or 38 and, thus, can escape from the cell 36, as shown in FIG. 4. By providing an opening at each end of the cell, the alevin is allowed to escape in either direction, depending upon which direction the alevin is facing. If, however, an alevin escapes from the incubator before it has absorbed all of its yolk sack, then it will remain in the gravel until substantially all of the remainder of the yolk sack has been absorbed.

To facilitate the flow of water around and through the cells 36, and also to enable the alevin to escape from between successive incubator modules, these modules must be spaced apart from one another. For this purpose, the incubator module sections 18 are each formed, at each of their four corners, with a rearwardly extending spacer projection 54, the free ends of which abuts against the front face 22 of the adjacent incubator module so as to maintain a spacing between the front face 22 and the back of the module section 18 on which such projection 54 is provided.

In the preferred embodiment of the invention, for use with salmon eggs, the cells 36, and thus the cylindrical recesses 30 and 32, have a diameter of 8 to 11 mm. The length of each cell 36 and thus the length of the cylindrical recesses 30 and 32, is about 26 mm., the front wall 28 and the rear wall 34 each having a thickness of 2 mm. and the length of the recess 30 being 10 mm. Different dimensions would be employed, for example, for trout eggs.

The alevin outlet openings 26 and 38 have a diameter of 4.5 to 5.5 mm., and it is particularly pointed out that this dimension may be varied somewhat in dependence on the species of salmonid egg being hatched.

Also, in this preferred embodiment, each module is formed with two hundred and fifty of the cells 36, but the invention is not restricted to this number of cells and may employ fewer or more cells. Also, while only four of these modules are illustrated in FIG. 1, a greater or lesser number of modules may be employed.

In use of the above incubator, the incubator module sections 16 and 18 are separated from one another, and one of the eggs 46 is then inserted into each of the recesses 30. Using the alignment pins 44, the incubator module rear section 18 are aligned with the front sections 16, and these two sections are pressed against one another to form a corresponding one of the modules.

A plurality of the modules are provided with eggs in this manner and are then connected together by the securement rods 20 and buried in the gravel bed 12 to allow the eggs 36 to hatch. After hatching, the alevins 48 are trapped in the cells 36, as described above, until they are able to escape through the openings 26 and 38.

As will be readily apparent to those skilled in the art, various modifications may be made in the above-described embodiment of the invention.

Accordingly, it is to be understood that the present invention may be varied within the scope of the appended claims.

I claim:

1. A salmonid egg incubator, comprising:
   means defining a plurality of cells for containing salmonid eggs;
   each of said cells being defined by walls which separate said cells from one another and which are dimensioned to retain, in each of said cells, an individual one of said salmonid eggs and an alevin hatched therefrom; and
   means defining in said walls of each of said cells an alevin outlet opening which is dimensioned to allow the respective alevin to escape through said opening only after said alevin has absorbed at least a major portion of its yolk sack, whereby said eggs and said alevins are separated from one another by said walls during the hatching of said eggs and until said alevins escape form said cells.

2. A salmonid egg incubator as claimed in claim 1, wherein said cell defining means comprises a pair of components which are relatively displaceable so as to open said cells to enable the insertion of said eggs into said cells.

3. A salmonid egg incubator as claimed in claim 1, wherein said outlet openings are provided at opposite ends of each of said cells, to allow water to flow into, along and from said cells and to allow the alevin to escape from either end of said cells.

4. A salmonid egg incubator as claimed in claim 1, wherein said alevin outlets openings have a diameter of 4.5 to 5.5 mm.

5. A salmonid egg incubator as claimed in claim 4, wherein said cell defining means comprises a pair of components which are relatively displaceable so as to open said cells to enable the insertion of said eggs into said cells.

6. A salmonid egg incubator as claimed in claim 4, wherein said outlet openings are provided at opposite end of each of said cells, to allow water to flow into, along and from said cells and to allow the alevin to escape from either end of said cells.

7. A salmonid egg incubator as claimed in claim 6, wherein said incubator comprises a plurality of separate modules and means for releasably securing said modules in back-to-front relationship, said modules each containing a plurality of said cells extending perpendicular to front and back major surfaces of the respective module.

8. A salmonid egg incubator as claimed in claim 7, wherein each of said modules is provided with spacer projections for maintaining a spacing between the front and back major surfaces of successive ones of said modules, said spacer projections being spaced apart from one another to leave openings therebetween for the flow of water between said spacing and the exterior of said incubator and to allow the alevin to escape from between said modules.

9. A salmonid egg incubator as claimed in claim 8, wherein said modules each comprise a pair of components which are relatively displaceable to open said cells for the insertion of the eggs into said cells and to close said cells for the incubation of the eggs in said cells.

10. A salmonid egg incubator as claimed in claim 9, wherein each of said modules is provided with spacer projections for maintaining a spacing between the front and back major surfaces of successive ones of said modules, said spacer projections being spaced apart from one another to leave openings therebetween for the flow of water between said spacing and the exterior of said incubator and to allow the alevins to escape from between said modules.

11. A salmonid egg incubator as claimed in claim 1, wherein said cells are cylindrical and each have a length of approximately 26 mm. and a diameter of 8 to 11 mm.

12. A salmonid egg incubator as claimed in claim 1, wherein said incubator comprises a plurality of separate modules and means for releasably securing said modules in back-to-front relationship, said modules each containing a plurality of said cells extending perpendicular to front and back major surfaces of the respective module.

13. A salmonid egg incubator as claimed in claim 12, wherein each of said modules is provided with spacer projections for maintaining a spacing between the front and back major surfaces of successive ones of said modules, said spacer projections being spaced apart from one another to leave openings therebetween for the flow of water between said spacing and the exterior of said incubator and to allow the alevin to escape from between said modules.

14. A salmonid egg incubator as claimed in claim 13, wherein each of said cells is formed by an aligned pair of recesses in respective ones of said components, and said recesses in one of said components are each dimensioned to receive only one egg therein.

15. A salmonid egg incubator as claimed in claim 13, wherein said alevin outlets openings have a diameter of 4.5 to 5.5 mm.

16. A salmonid egg incubator as claimed in claim 12, wherein said modules each comprise a pair of components which are relatively displaceable to open said cells for the insertion of the eggs into said cells and the close said cells for the incubation of the eggs in said cells.

17. A salmonid egg incubator as claimed in claim 16, wherein each of said modules is provided with spacer projections for maintaining a spacing between the front and back major surfaces of successive ones of said modules, said spacer projections being spaced apart from one another to leave openings therebetween for the flow of water between said spacing sand the exterior of said incubator and to allow the alevins to escape from between said modules.

18. A salmonid egg incubator in accordance with claim 1 wherein said plurality of cells is disposed in vertical array.

19. A salmonid egg incubator in accordance with claim 18 wherein said cells in the vertical array extend horizontally, with said outlet opening being provided at one of the end thereof and with an additional opening being provided at the opposite end thereof.

20. A method of incubating salmonid eggs, comprising the steps of:
placing said eggs into respective ones of an array of salmonid egg incubator cells;
immersing said array of cells in water and allowing the water to enter the cells through respective opening;
said openings being dimensioned to retain said eggs and the alevin hatched therefrom within said cells until each of the alevin has absorbed at least a major portion of its yoke sack and then to allow the alevin to escape from its respective cells through the respective openings.

21. A method as claimed in claim 20, which includes allowing the water to flow through each of said cells during the incubation of the egos.

22. A method as claimed in claim 20, which includes burying said array of cells in gravel in the water during the incubation of the egos.

* * * * *